United States Patent [19]

Ward

[11] 3,849,293

[45] Nov. 19, 1974

[54] HYDROCRACKING PROCESS UTILIZING REJUVENATED CATALYST

[75] Inventor: John W. Ward, Yorba Linda, Calif.

[73] Assignee: Union Oil company, Los Angeles, Calif.

[22] Filed: Feb. 22, 1973

[21] Appl. No.: 334,873

Related U.S. Application Data

[63] Continuation-in-part of Ser. No. 121,536, March 5, 1971, abandoned.

[52] U.S. Cl. ............... 208/111, 208/120, 252/411 R
[51] Int. Cl. ............................................ C10g 13/02
[58] Field of Search ............ 208/111, 120; 252/411, 252/420

[56] References Cited
UNITED STATES PATENTS

| | | | |
|---|---|---|---|
| 3,493,490 | 3/1970 | Plank et al. | 252/412 |
| 3,533,959 | 10/1970 | Miale et al. | 252/411 R |
| 3,684,738 | 8/1972 | Chen | 252/411 R |
| 3,692,692 | 9/1972 | Ward et al. | 252/411 R |
| 3,781,199 | 12/1973 | Ward | 208/111 |

*Primary Examiner*—Delbert E. Gantz
*Assistant Examiner*—James W. Hellwege
*Attorney, Agent, or Firm*—Lannas S. Henderson; Richard C. Hartman; Dean Sandford

[57] ABSTRACT

Siliceous zeolite catalysts comprising zeolitic mono- and/or divalent metal cations and a non-zeolitic Group VIII noble metal hydrogenating component supported thereon, which catalysts have undergone damage by thermal and/or hydrothermal stresses resulting in a maldistribution of the metal components, are rejuvenated to higher-than-fresh activity by treatment with an aqueous ammonia solution containing a dissolved ammonium salt. The treatment has a twofold effect of exchanging out at least a portion of the zeolitic mono- and/or divalent metal ions, and bringing about a desirable redistribution of the Group VIII noble metal.

9 Claims, No Drawings

HYDROCRACKING PROCESS UTILIZING REJUVENATED CATALYST

RELATED APPLICATIONS

This application is a continuation-in-part of Ser. No. 121,536, filed Mar. 5, 1971 and now abandoned.

BACKGROUND AND SUMMARY OF THE INVENTION

It is well known that maximum activity of the Group VIII noble metals for hydrogenation reactions depends upon maintaining the metal in a finely divided state such that there is a maximum ratio of surface area to mass. Perhaps the most common method of achieving a high degree of dispersion involves impregnating salts of the Group VIII noble metals upon porous solid supports, followed by drying and decomposing of the impregnated salt. On non-zeolitic supports, the drying and calcining operations often bring about a substantial migration and agglomeration of the impregnated metal, with resultant reduction in activity. In more recent years, with the advent of highly active crystalline zeolite catalysts of the aluminosilicate type, it has become common practice to ion-exchange the desired metal salt into the zeolite structure in an attempt to achieve an initial ionic bond between each metal atom and an exchange site on the zeolite, thus achieving the ultimate in dispersion of metal while also bonding the metal to the zeolite in such manner as to minimize migration and agglomeration during the drying and calcining steps in which at least a portion of the metal is oxidized and converted to a nonzeolitic form. This ion exchange technique is particularly desirable in the case of dual-function catalysts such as hydrocracking catalysts wherein it is desirable to maintain an active hydrogenating site closely adjacent to an acid cracking site. These efforts have met with varying degrees of success.

Even though the above described ion-exchange techniques can give a high degree of initial dispersion of the Group VIII noble metal on the support, conditions encountered during subsequent use of the catalyst may bring about a maldistribution of the metal with resultant reduction in activity, entirely independent of normal deactivating phenomena such as coking, fouling, poisoning, etc. Overheating, or contact with excessive partial pressures of water vapor at high temperatures, such as may occur during oxidative regeneration of the catalyst or during prolonged contacting with hydrocarbon feedstocks, may bring about migration of the active metal away from the exchange sites, and this migration may, under particularly severe conditions, ultimately result in macro-agglomeration of the metal into crystallites of 100–200 A or more in diameter. This particular type of damage is most apt to occur under oxidizing conditions at temperatures of 500°–950°F. where high partial pressures of water vapor are present.

The process of this invention is particularly directed to correcting non-zeolitic Group VIII noble metal maldistribution resulting from thermal and/or hydrothermal stresses encountered by the catalyst in normal usage, regeneration, or during accidental upsets entailing uncontrolled temperatures and/or water vapor partial pressures. Normally these stresses bring about a maldistribution of active metal short of extensive agglomeration to particle sizes larger than about 50 A. For example, metal atoms or aggregates initially located closely adjacent to active exchange sites on the carrier may migrate to other less active areas, thus reducing the statistical liklihood of conjoint action on the feedstock molecules of both an acidic cracking site and a hydrogenation site. Further migration may tend to drive the metal deeper into the support structure, or into pore structures which are relatively inaccessible by feed molecules, all resulting in reduced overall hydrogenation activity.

Limited migration of these types may occur when the catalyst, in a sulfided condition (as e.g., in normal use for hydrocracking), or in an oxidized state (as during regeneration), comes into contact for more than about 30 minutes with water vapor of greater than about 3 psi partial pressure at temperatures above about 500°F. Extended contacting under these conditions, or at extremely high partial pressures of water vapor, e.g., above about 100 psi, can ultimately lead to macro-agglomeration of the type previously described. If this should occur, the rejuvenation procedure of this invention is in some cases less effective per se, but can in any case be advantageously utilized following partial redispersal of the agglomerated metal by, for example, the methods described in U.S. Pat. Nos. 3,197,399 and/or 3,287,257. The processes described in these patents, involving respectively alternating oxidation-reduction cycles, and alternating sulfiding-oxidation cycles, can bring about a substantial redispersion of agglomerated metal into particles of less than about 50 A diameter, but do not in most instances bring about a complete recovery of the fresh catalyst activity. The process of this invention is designed to achieve at least a complete recovery of fresh activity; but in nearly all cases it is found that the rejuvenated catalysts actually exhibit greater than fresh activity.

In the case of catalysts which originally contained a difficulty reducible zeolitic monovalent and/or divalent metal such as sodium, calcium, magnesium, nickel, manganese or the like, it has been found that the above described conditions encountered during use of the catalyst also appear to bring about, in addition to migration of the non-zeolitic hydrogenating metal, a detrimental redistribution of the zeolitic metal cations. Residual zeolitic metal cations, particularly sodium, are believed to occupy mainly the relatively unavailable exchange sites in the hexagonal prisms and sodalite cages of the original zeolite structure, but under the described conditions of use, migration to more active cracking sites appears to occur with resultant loss in cracking activity. Divalent metal cations such as the alkaline earth metals, which may have been originally exchanged into the zeolite to achieve hydrothermal stability, may also migrate to undesirable sites. It is hence desirable in the case of these damaged catalysts to remove at least some of the zeolitic mono- and/or divalent metal cations, in addition to redistributing the non-zeolitic Group VIII noble metal hydrogenating component. These are the major objectives of the present invention.

As employed herein, the term "non-zeolitic metal" refers to the metal content of the catalyst, other than anionic lattice metals such as aluminum, which is not chemically bonded to the anionic exchange sites of the zeolite, while conversely, "zeolitic metal" refers to the metal content which is so bonded. The easily reducible metals such as the Group VIII noble metals are normally present primarily as non-zeolitic metal, as a result of previous reduction with hydrogen, oxidation and/or sulfiding treatments. The difficulty reducible metals such as the alkali and alkaline earth metals are normally present almost exclusively as zeolitic cations, since they are not affected by the usual reduction, oxidation or sulfiding treatments. Metals of intermediate reducibility such as nickel, copper and the like may be present in both zeolitic and non-zeolitic form.

In its broadest aspect, the rejuvenation procedure of this invention involves simply digesting the damaged zeolite catalyst with an aqueous ammonia solution, with time and temperature conditions adjusted to effect replacement of at least a portion of the detrimental zeolitic mono- and/or divalent metal cations with ammonium ions, thereby increasing the cracking activity of the catalyst. At the same time, the non-zeolitic Group VIII noble metal content appears to become redistributed in some unknown manner, thereby increasing the hydrogenation activity.

A surprising aspect of the invention is that the aqueous ammonia solution does not extract any significant amount of the Group VIII noble metal from the catalyst. In copending application Ser. No. 874,063, filed Nov. 4, 1969, a progenitor rejuvenation process is disclosed, which involves treating the damaged catalyst with ammonia and water vapor under controlled conditions of hydration. This treatment was found to be sufficient to effect desirable redistribution of the Group VIII noble metal, resulting in a substantial recovery of activity, but was not conceived or disclosed as a method for the concomitant removal of zeolitic metal cations. It was believed at the time that the presence of excess aqueous ammonia would tend to solubilize the Group VIII noble metal as amminohydroxide which would then be leached out of the catalyst. It hence came as a distinct surprise to find that large excesses of aqueous ammonia could be utilized at high temperatures and for extended periods of time, sufficient to exchange out substantial proportions of the zeolitic metal cations, while extracting substantially none of the non-zeolitic Group VIII noble metal. The original theory as to the mechanism by which the Group VIII noble metal is redistributed on the zeolite by the ammonia treatment may hence be incorrect; if a soluble species of the Group VIII noble metal is formed, it is apparently so highly basic that it is retained substantially quantitatively in the acid zeolite structure even in the presence of large excesses of aqueous ammonia.

The foregoing is in sharp contrast to the results observed when catalysts containing an iron-group metal are subjected to treatment with the ammoniacal solutions employed herein. A nickel-containing zeolite catalyst for example was found to lose a substantial portion of its nickel content to an ammoniacal ammonium nitrate treating solution. Aqueous ammonium hydroxide alone is an even more efficient extractant for the iron, cobalt or nickel components of regenerated catalysts.

A preferred modification of the invention consists in adding to the ammonia solution a soluble ammonium salt, e.g., ammonium nitrate. With aqueous ammonia alone, it is difficult to exchange out a major proportion of the zeolitic mono- and/or divalent metals without resorting to an expensive multi-stage operation employing large volumes of solution. By adding an ammonium salt the exchange is much facilitated so that larger proportions of the zeolitic metals can be exchanged out at lower temperatures in shorter periods of time, and using smaller volumes of solution. However, in using the added ammonium salt, the conditions of temperature and contact time must be suitably controlled because it is found that, in contrast to aqueous ammonia, the ammonium salts do tend to bring about a solubilization and leaching out of the Group VIII noble metal from the catalyst. This tendency can however be substantially avoided by controlling temperature and contact time.

While the use of ammonium salt is normally preferred for the foregoing reasons, it will be understood that the use of ammonia alone does present the advantageous feature of eliminating the necessity for careful control of temperatures, contact times, etc in order to avoid leaching out the Group VIII noble metal. In some types of operations, this feature may outweigh the advantages enumerated above for the use of ammonium salts.

Another progenitor of the present invention is disclosed in U.S. Pat. No. 3,642,692, involving the sequential treatment of the damaged zeolites with aqueous solutions of ammonium salts, and with ammonia under the controlled conditions of hydration disclosed in the above noted application Ser. No. 874,063. The preferred techniques disclosed in said patent achieve the same basic objectives as herein, and in some cases appear to produce a somewhat more active rejuvenated catalyst. However, the sequential treatment is considerably more expensive and time consuming, and the present single-stage process hence represents a substantial economic advantage. The procedure described herein is simple and economical and gives complete rejuvenation of zeolite-based Group VIII noble metal catalysts wherein a maldistribution of metals has occurred as a result of overheating, or of contacting the catalyst while in an oxidized or sulfided state with water vapor at temperatures between about 500° and 1,200°F.

DETAILED DESCRIPTION

A. The Aqueous Ammonium Hydroxide Treatment

The ammonia solutions utilized herein may vary in strength over a wide range of about 0.1 to 30 percent, preferably about 0.5 to 10 percent by weight $NH_3$. The treatment may be carried out by conventional procedures which involve in general contacting the catalyst with the ammonium hydroxide solution in a single stage, in plural batch stages, or continuously by flowing a stream of the ammonia solution through a bed of the catalyst. Normally it is desirable to control the severity of contacting, or use the number of stages required, to remove at least about 20 percent, and preferably at least about 50 percent of the zeolitic monovalent cations such as sodium. The divalent metals, e.g., magnesium are somewhat more difficult to remove, but are not as detrimental as the alkali metals, and acceptable rejuvenated catalysts can be produced wherein little if any of the divalent metals have been exchanged out. However, it is normally preferred to remove at least about 10 percent, and preferably at least about 20 percent of the divalent metal content. This latter objective is difficult to achieve with ammonia alone, and hence where maximum divalent metal removal is desired, it is preferred to use an added ammonium salt in the ammonia contacting solution. Suitable ammonium salts include e.g., the nitrate, sulfate, chloride, acetate, or the like. Suitabe concentrations thereof may range between about 1 percent and 50 percent by weight, preferably 5–25 percent.

When aqueous ammonia is used alone, practical contacting temperatures range between about 40° and 100°C., preferably about 50°–90°C. At least about 2 or 3 contacting stages are normally desirable to remove significant amounts of the zeolitic monovalent metals. By utilizing pressure vessels, higher temperatures in the range of about 100° to 200°C. may be utilized. Under these conditions, at least about 90 percent of the Group VIII noble metal is retained in the catalyst in a desirably redistributed form.

When an ammonium salt is used along with the aqueous ammonia, somewhat milder contacting conditions are usually preferred to avoid leaching out the non-zeolitic Group VIII noble metal. Preferred contacting temperatures range between about 10°–100°C, but temperatures up to about 125°C. can be utilized if the contacting time is limited to, e.g., about 10–30 minutes per stage. One to three stages of contacting are normally sufficient when an ammonium salt is present. It is not essential to completely avoid the leaching out of Group VIII noble metal, since in many instances highly active catalysts have been prepared even when some 20 to 30 percent of the metal was removed. However, by selecting mild contacting conditions, at least about 90 percent of the Group VIII noble metal can be retained in the catalyst.

Normally the desired redistribution of Group VIII noble metal on the zeolite base takes place fairly rapidly, i.e., within about 10–30 minutes. However, the desired removal of zeolitic mono- and/or divalent metal cations usually requires substantially longer contact times, ranging from about 1 to 8 hours, depending upon the contacting temperatures and the number of stages utilized.

In order to extract and remove zeolitic cations from the zeolite in the manner described above, it will be apparent that a sufficient volume of ammoniacal solution must be employed to provide an excess interstitial phase thereof, over the amount required to merely fill the internal pores of the zeolite. This excess need of course be only sufficient to retain in solution at equilibrium the proportion of zeolitic cations to be removed from the zeolite. It is normally desirable to employ at least about 2 volumes of solution per volume (bulk) of catalyst.

It will be understood that in cases where the zeolite base is in a hydrogen or "decationized" form, the ammonia treatment will at least partially convert the zeolite to an ammonium zeolite. This zeolitic ammonia is removed during the final drying and calcining steps described hereinafter.

B. Drying and Calcining

Following the ammonia treatment, and after washing the catalyst to remove excess ammonia and ammonium salts therefrom, it is ordinarily desirable to convert the hydrated-ammoniated catalyst to a dehydrated, deammoniated, oxidized form. These objectives can be achieved with difficulty by a carefully controlled rapid heatup to, e.g., 950°F. in air, but to achieve maximum catalytic activity in this manner would be a practical impossibility. The reason for this stems from the observed fact that at temperatures between about 500° and 950°F. the Group VIII noble metal on the catalyst, when in an oxidized state, tends to undergo severe agglomeration unless the water vapor partial pressures is carefully controlled. Hence, a rapid heatup in air would tend to raise the catalyst temperature to above 500°F. before some portions of the catalyst bed (or even some areas of each catalyst pellet) had been sufficiently dehydrated to permit control of localized water vapor concentrations. In general, in order to avoid agglomeration of oxidized metal on the catalyst in the 500°–950°F. temperature range, it is desirable to maintain water vapor partial pressures below about 10 psi, and preferably below 2 psi. It is therefore highly desirable to reduce the water content of the catalyst to a practical minimum at temperatures below 500°F., for at temperatures above about 500°F. the catalyst is rapidly being converted to an oxidized state with chemical evolution of water. At below about 500°F., the metal or metal oxide is not affected by water vapor.

Accordingly, for the above purposes, a preferred drying step is carried out by passing a stream of air or other nonreducing gas through a bed of the catalyst without maintaining dewpoint control over the effluent gases. It is generally preferable to start the drying at a low temperature of e.g., 100° to 200°F., and incrementally raise the stripping gas temperature to a level in the 300° to 500°F. range. During the drying step, nearly all of the aqueous ammonia remaining in the catalyst is removed, any remaining ammonia being primarily in the form of zeolitic ammonium cations. It is this zeolitic ammonium which creates an additional problem of water vapor partial pressure control during the subsequent calcination step, for it is during this step that zeolitic ammonium is oxidized to form additional water vapor (and nitrogen), which adds its effect to that of the water vapor generated by desorption of any remaining water in the catalyst. Hence the desirability of stripping out at least about one-half, and preferably at least about two-thirds, of the absorbed water during the drying step at temperatures below about 500°F.

It is to be noted also that reducing gases such as hydrogen should be substantially absent during the drying step. For reasons which are not clearly understood, direct reduction of the complex Group VIII noble metal ammine cation to the free metal always results in severe agglomeration thereof. Hence the necessity for first converting the metal ammino complex to an oxidized state during the calcining step, and then later reducing the oxidized metal to activate the same for use in hydrocarbon conversions. Suitable stripping gases for use in the drying step include air or other oxygen-containing gases, nitrogen, argon, and the like. The drying is normally carried out at atmospheric pressures, or slightly elevated pressures of e.g., 50 to 100 psig. Where crystalline zeolite catalysts are concerned, it is normally desirable to reduce the water content to about 5–10 weight-percent.

The calcination step may be performed in the same apparatus employed for the drying step if desired, e.g., in a rotary kiln, a moving belt furnace, or in a vessel containing a fixed bed of the catalyst. To initiate the calcination, air is admixed with the stripping gas, initially in small proportions to provide an oxygen concentration of e.g., about 0.1 percent to 1 percent by volume. The temperature of the calcination gas is then gradually increased from about 500°F. to 700°–750°F. while gradually increasing the oxygen concentration to e.g., about 0.5 percent to 2 percent. During this heatup period, water concentration in the calcination vessel should be carefully controlled, as by monitoring the effluent gases to maintain a dewpoint below about 40°F., preferably below 20°F. Following each incremental increase in oxygen concentration it is generally desirable, in the case of fixed bed calcination, to wait for the exothermic temperature wave to pass through the catalyst bed and until oxygen breakthrough has occurred before the next incremental increase in oxygen concentration is effected. Continuing in this manner, inlet gas temperatures and oxygen concentrations are increased until temperatures of about 900° to 1,100°F. and final oxygen concentrations in the range of about 2–10 percent or more are reached. When the terminal temperature and oxygen concentrations are reached, the calcination is then preferably continued for a sufficient length of time to give an effluent gas stream having a dewpoint below about 0°F., preferably below about –20°F.

The gradual heatup procedure with incremental increases in oxygen concentration as described above is a practical necessity when the calcination is carried out with a deep bed of catalyst through which the calcination gases are passed. It is not intended however that the invention be limited to this procedure, for a considerably more rapid heatup at high oxygen concentrations can be utilized when the catalyst is arranged in thin layers through which the gases pass, whereby the effect of water vapor on downstream portions of the catalyst is minimized. Commerically, a rotary kiln equipped with lifters and a dry air sparger to provide good ventilation of the cascading bed of catalyst is very effective in achieving the desired results. A particularly critical period during the calcination appears to be the period of burnoff of zeolitic ammonium ions, which occurs primarily at temperatures above about 750°F. and can generate a burning wave in the catalyst wherein instantaneous temperatures and water vapor concentrations may inhibit full recovery of the original fresh catalyst activity. Accordingly, greatest care should be exercised to minimize water vapor concentrations during the 750°–1,000°F. heating cycle.

C. Catalyst Compositions

Catalyst compositions which may be rejuvenated by the above procedures include hydrogenation catalysts, hydrocracking catalysts, isomerization catalysts, reforming catalysts and the like which comprise a Group VIII noble metal supported on a siliceous zeolite base having an ion exchange capacity of at least about 0.01 meq/gm, and preferably at least about 0.1 meq/gm. Suitable siliceous zeolite bases include for example the crystalline aluminosilicate molecular sieves such as the Y, (including ultrastable Y) X, A, L, T, $\Omega$, and B crystal types, as well as zeolites found in nature such as for example mordenite, stilbite, heulandite, ferrierite, dachiardite, chabazite, erionite, offretite, and the like. The preferred crystalline zeolites are those having crystal pore diameters between about 7–15 A, wherein the $SiO_2/Al_2O_3$ mole ratio is about 3/1 to 10/1. For most catalytic purposes, e.g., catalytic hydrocracking, it is preferable to replace most or all of the zeolitic alkali metal cations normally associated with such zeolites with other cations, particularly hydrogen ions and/or polyvalent metal ions such as magnesium, calcium, zinc, rare earth metals and the like.

The utilitarian effect of the ammonia treatment of this invention is most evident in the case of catalysts containing significant proportions, e.g., 0.5 – 10 percent by weight, of zeolitic mono- and/or divalent metal ions, particularly the metals of Groups IA, IIA and IIB, e.g., sodium, potassium, calcium, magnesium, zinc, etc, as well as iron, cobalt, nickel and the like.

In addition to the crystalline zeolite bases described above, other zeolitic bases may be employed such as the zeolitic cogels of silica and alumina, silica and titania, silica and zirconia, silica and magnesia and the like.

The Group VIII noble metal hydrogenating component is ordinarily added to the zeolite base by ion exchange with an aqueous solution of a suitable compound of the desired metal wherein the metal is present in a cationic form, as described for example in U.S. Pat. No. 3,236,762. Suitable amounts may range between about 0.1 percent and 3 percent by weight. Palladium and platinum are preferred, but rhodium, ruthenium, iridium and osmium may also be employed. Other metals such as rhenium may also be included.

When catalysts of the foregoing description are utilized for extended periods of time at temperatures of, e.g., 400° – 950°F in hydrocarbon conversions such as hydrocracking, hydrogenation, isomerization, reforming and the like, a progressive decline in catalyst activity normally occurs as a result of coke deposition. A more rapid or sudden decline in activity may follow when the catalyst encounters, either during hydrocarbon conversion or during regeneration, any of the adverse conditions of temperature and water vapor partial pressure previously described. Deactivation by coking is normally almost completely reversible by conventional oxidative regeneration at temperatures of e.g., 750° – 1100°F. When it is found that such oxidative regeneration restores less than about 90 percent of the fresh hydrogenation activity, and less than about 90 percent of the fresch cracking activity, it may be assumed that some undesirable maldistribution of the metal content has occurred, such as to warrant use of the rejuvenation procedure described herein. It will be understood that hydrogenation activity is measured in terms of, and is inversely proportional to, the volume of catalyst required to effect a given degree of hydrogenation per pass of a particular compound, e.g., benzene, at a particular set of hydrogenation conditions. Cracking activity can be measured in terms of the standard Cat-A cracking activity index.

The following examples are cited to illustrate the invention, but are not to be construed as limiting in scope.

EXAMPLE I

This example illustrates a typical type of hydrothermal deactivation which can occur during catalytic hydrocracking. A hydrocracking run was carried out over a period of about twenty months utilizing a catalyst consisting of 0.47 weight-percent Pd supported on a Y molecular sieve cracking base having a $SiO_2/Al_2O_3$ mole-ratio of about 4.7, wherein about 35 percent of the zeolitic ion exchange capacity was satisfied by magnesium ions (3.47 weight-percent MgO), about 10 percent by sodium ions (1.39 weight-percent $Na_2O$), and the remainder (55 percent) by hydrogen ions. This catalyst was maintained in a sulfided condition throughout the run by virtue of a sour recycle gas containing about 0.3 volume-percent of hydrogen sulfide. The run was carried out at a pressure of about 1500 psig, with space velocities varying between about 1.3 and 1.7, hydrogen rates varying between 5,000 and 7,000 scf/b, and with hydrocracking temperatures progressively increasing from about 500°F. to 680°F. The feedstock was a substantially sulfur- and nitrogen-free unconverted gas oil (400°–850°F. boiling range) derived from a previous stage of hydrocracking. Hydrocracking temperatures were incrementally raised during the run to maintain 60–70 volume percent conversion per pass to gasoline.

During this run, a foaming problem was encountered in the recycle gas water-washing column, resulting in a substantial quantity of water being carried into the reactor, giving an estimated 100 psi partial pressure of water vapor therein for a period of about 4 hours. An immediate temperature increase of about 55°F. was required in order to maintain the desired conversion level, this temperature increase corresponding to a loss in catalytic activity of about 85 percent.

At the end of this run, the catalyst was carefully regenerated by oxidative combustion at temperatures ranging from about 700° to 1,000°F., utilizing a regeneration gas comprising oxygen in amounts increasing from about 0.1 to 3.0 volume percent, whereby water vapor partial pressures were maintained at a value below about 0.25 psia at all regeneration temperatures above 500°F. The regenerated catalyst was then tested for activity compared to that of the fresh catalyst. The feedstock used for the activity test was the same feed used in the previous hydrocracking run, doped with thiophene to a level of 0.48 percent sulfur to provide an $H_2S$-containing atmosphere for the hydrocracking. Conditions of the activity test were: pressure 1,450 psig, LHSV 1.7, hydrogen/oil ratio 8,000 scf/b, conversion per pass, 52–54 volume-percent to gasoline. The following table shows the temperatures required to maintain the above conversion as a function of time:

Table 1

| Hours | Fresh Catalyst | Regenerated Catalyst |
|---|---|---|
| 20 | 528°F. | 577°F. |
| 50 | 542 | 596 |
| 75 | 546 | 605 |
| 100 | 549 | 611 |
| 125 | 551 | 616 |
| 150 | 553 | 620 |
| 250 | 559 | 629 |
| 500 | 564 | 637 |
| 700 | 565 | 642 |

It will be noted that the regenerated catalyst required an initial hydrocracking temperature 49° higher than did the fresh catalyst, indicating decreased cracking activity resulting presumably from migration of sodium and/or magnesium ions. Also, the regenerated catalyst declined much more rapidly in activity, requiring a 77°F. higher temperature at the end of 700 hours. The high deactivation rate of the regenerated catalyst indicates a deficiency in hydrogenation activity resulting from a maldistribution of the palladium brought about during the above described process upset.

EXAMPLE II

A 100 gm sample of the catalyst regenerated as described in Example I was stirred at room temperature for two hours with a solution of 200 ml of 30 percent ammonia solution and 800 ml of water. After removal of the solution by filtration, the procedure was repeated twice. Finally the catalyst was contacted for 2 hours with a boiling solution of 250 ml of 30 percent ammonia — 250 ml water, filtered and washed.

The washed catalyst was then partially dried to a water content of about 6–8 weight-percent in a muffle furnace through which a stream of dry air was passed for 2 hours at temperatures increasing from ambient to 480°F., and then for 2 hours at 480°F. Finally the catalyst was calcined in the same muffle furnace while continuing the flow of dry air for 1 hour at temperatures increasing from 480° to 930°F., and then for 1 hour at 930°F. The rejuvenated catalyst analyzed as follows:

| | Weight Percent |
|---|---|
| Pd | 0.47 |
| $Na_2O$ | 0.85 |
| MgO | 3.17 |

Upon activity testing the catalyst as described in Example I, the following results were obtained:

Table 2

| Hours | Temp. for 52–54% Conversion to 400°F. E.P. Gasoline |
|---|---|
| 50 | 537 |
| 75 | 544 |
| 100 | 547 |
| 125 | 546 |
| 150 | |

It is thus apparent that the aqueous ammonia treatment restored the catalyst to at least its original fresh activity while, contrary to expectations, removing none of the palladium. The sodium content was moderately reduced, but only a minor proportion of the magnesium was removed. As a result of the removal of sodium and magnesium, the activity of the rejuvenated catalyst was superior to that of the catalyst rejuvenated by the gaseous technique described in application Ser. No. 874,063.

EXAMPLE III

Another 100 gm. sample of the regenerated catalyst from Example I was digested at 180°F. for 2 hours with a solution of 200 ml of 30 percent aqueous ammonia solution and 100 gm. of ammonium nitrate dissolved in 800 ml of water. After removal of the solution by filtration, the procedure was repeated twice. The catalyst was then dried and calcined as in Example II. The resulting catalyst was found to contain:

| | Weight Percent |
|---|---|
| Pd | 0.35 |
| $Na_2O$ | 0.59 |
| MgO | 1.13 |

Upon activity testing the catalyst as described in Example I, the following results were obtained.

Table 3

| Hours | Temp. for 52–54% Conversion to 400°F. E.P. Gasoline |
|---|---|
| 50 | 527 |
| 75 | 533 |
| 100 | 536 |
| 125 | 539 |
| 150 | 541 |

It is apparent that the 180°F. aqueous ammonia-ammonium nitrate treatment, even though removing about 23 percent of the original Pd, gave a catalyst which was much more active than the original fresh catalyst. This is believed attributable to the removal of most of the sodium and magnesium, as well as a more favorable redistribution of the Pd. The following example shows that the removal of Pd can be substantially avoided by suitably adjusting the digestion conditions.

EXAMPLE IV

The procedure of Example III was repeated except that only half as much ammonia was employed, and the digestions were carried out at room temperatures instead of 180°F. The resulting catalyst contained:

|   | Weight Percent |
|---|---|
| Pd | 0.45 |
| Na$_2$O | 0.85 |
| MgO | 3.07 |

Upon activity testing as previously described, the following results were obtained:

Table 4

| Hours | Temp. for 52–54% Conversion to 400°F. E.P. Gasoline |
|---|---|
| 50 | 527 |
| 75 | 533 |
| 100 | 540 |
| 125 | 541 |
| 150 | 542 |

These results appear to be essentially equivalent to those of Example III. Apparently the higher sodium and magnesium contents of the rejuvenated catalyst are counterbalanced by the increased retention of Pd. It is reasonable to assume however, that the increased Pd retention will give longer catalyst life.

For convenience, the essential data from the foregoing Examples is tabulated as follows:

| Example | I | I | II | III | IV |
|---|---|---|---|---|---|
| Catalyst Treatment | Fresh | Regen. | NH$_3$—H$_2$O | NH$_3$—NH$_4$NO$_3$ H$_2$O, 180°F. | NH$_3$—NH$_4$NO$_3$ H$_2$O, Room Temp. |
| Wt % | | | | | |
| Pd | 0.47 | 0.47 | 0.47 | 0.35 | 0.45 |
| Na$_2$O | 1.39 | 1.39 | 0.86 | 0.59 | 0.85 |
| MgO | 3.47 | 3.47 | 3.17 | 1.13 | 3.07 |
| Activity | | | Temp. for 52–54% Conversion to 400°F. E.P. Gasoline | | |
| Hours | | | | | |
| 50 | 542 | 596 | 537 | 527 | 527 |
| 75 | 546 | 605 | 544 | 533 | 533 |
| 100 | 549 | 611 | 547 | 536 | 540 |
| 125 | 551 | 616 | 546 | 539 | 541 |
| 150 | 553 | 620 | — | 541 | 542 |

The foregoing details as to specific catalysts and rejuvenation conditions are not intended to be limiting in effect. The following claims and their obvious equivalents are intended to define the true scope of the invention:

I claim:

1. A process for the hydrocracking of a hydrocarbon feedstock to produce lower boiling hydrocarbons, which comprises subjecting said feedstock in admixture with added hydrogen to hydrocracking conditions of pressure and temperature in contact with a catalyst comprising a non-zeolitic Group VIII noble metal supported on a siliceous zeolite carrier which also, as originally prepared, contained zeolitic mono- and/or divalent metal cations, said catalyst having been previously subjected to thermal and/or hydrothermal conditions resulting in a maldistribution of said Group VIII noble metal on said carrier with resultant reduction in hydrogenation activity and in a deleterious migration of said zeolitic metal cations resulting in a reduction in cracking activity, and which has thereafter been rejuvenated to greater than its original fresh activity by a process which comprises:
   A. digesting said catalyst in an oxidized or sulfided state with a reagent consisting essentially of a 0.1 – 30 weight-percent aqueous ammonia solution containing a dissolved ammonium salt, and correlating the contacting time with the temperature and reagent strength so as to extract from said catalyst at least a substantial portion of said zeolitic metal cations while retaining in the catalyst at least about 70 percent of said Group VIII noble metal;
   B. separating said catalyst from the resulting ammoniacal extract of zeolitic metal cations; and
   C. drying and calcining the separated catalyst.

2. A process as defined in claim 1 wherein said zeolitic metals comprise an alkali metal.

3. A process as defined in claim 1 wherein said drying and calcining in step (C) are performed by:
   1. stripping the hydrated ammoniated catalyst in a stream of non-reducing gas at temperatures below about 500°F. to effect partial deammoniation and drying with removal of at least one-half of the initial water content thereof; and
   2. calcining the partially dried and deammoniated catalyst in a stream of oxygen-containing gas at temperatures controlled between about 500° and 1,200°F. to maintain the dewpoint of the effluent gas stream below about 40°F., at least the terminal portion of said calcining being carried out at temperatures between about 750° and 1,200°F.

4. A process as defined in claim 1 wherein said Group VIII noble metal is palladium.

5. A process as defined in claim 1 wherein said siliceous zeolite carrier is a crystalline molecular sieve.

6. A process for the hydrocracking of a hydrocarbon feedstock to produce lower boiling hydrocarbons, which comprises subjecting said feedstock in admixture with added hydrogen to hydrocracking conditions of pressure and temperature in contact with a catalyst comprising a non-zeolitic Group VIII noble metal supported on a Y zeolite base which also, as originally prepared, contained zeolitic hydrogen ions and sodium cations, said catalyst having previously been utilized in a hydrocarbon conversion process to substantial deactivation and subsequently regenerated by oxidative combustion, and during said hydrocarbon conversion and/or regeneration having been subjected to thermal and/or hydrothermal conditions resulting in a reduction in hydrogenation activity and cracking activity, said catalyst having thereafter been rejuvenated to greater than its original fresh activity by a process which comprises:

A. digesting said catalyst in an oxidized or sulfided state with at least about 2 volumes per volume of catalyst of a reagent consisting essentially of a 0.1 - 30 weight-percent aqueous ammonia solution containing a dissolved ammonium salt, and correlating the contacting time with the temperature and reagent strength so as to extract from said catalyst at least a substantial portion of said zeolitic sodium cations while retaining in the catalyst at least about 70 percent of said Group VIII noble metal;

B. separating said catalyst from the resulting ammoniacal extract of zeolitic sodium cations; and C. drying and calcining the separated catalyst.

7. A process as defined in claim 6 wherein said Group VIII noble metal is palladium.

8. A process as defined in claim 6 wherein the contacting conditions in step (A) are controlled so as to extract at least about 20 percent of said zeolitic sodium ions.

9. A process as defined in claim 6 wherein said contacting in step (A) is carried out at a temperature between about 10° and 125°C.

* * * * *